United States Patent
Weirich

(10) Patent No.: US 10,495,180 B2
(45) Date of Patent: Dec. 3, 2019

(54) WIRE ROPE ASSEMBLY UNIT

(71) Applicant: CASAR Drahtseilwerk Saar GmbH, Kirkel (DE)

(72) Inventor: Johannes Weirich, Saarbrücken (DE)

(73) Assignee: CASAR DRAHTSEILWERK SAAR GMBH, Kirkel (DE)

( * ) Notice: Subject to any disclaimer, the term of this patent is extended or adjusted under 35 U.S.C. 154(b) by 804 days.

(21) Appl. No.: 14/762,295

(22) PCT Filed: Dec. 17, 2013

(86) PCT No.: PCT/DE2013/100427
§ 371 (c)(1),
(2) Date: Jul. 21, 2015

(87) PCT Pub. No.: WO2014/114277
PCT Pub. Date: Jul. 31, 2014

(65) Prior Publication Data
US 2015/0354666 A1 Dec. 10, 2015

(30) Foreign Application Priority Data

Jan. 25, 2013 (DE) ........................ 10 2013 100 732

(51) Int. Cl.
*F16G 11/02* (2006.01)
(52) U.S. Cl.
CPC ............ *F16G 11/025* (2013.01); *F16G 11/02* (2013.01); *Y10T 24/398* (2015.01);
(Continued)
(58) Field of Classification Search
CPC ....... F16G 11/02; F16G 11/025; Y10T 24/398
(Continued)

(56) References Cited

U.S. PATENT DOCUMENTS

| 1,908,838 A | 5/1933 | Green et al. |
| 2,901,822 A | 9/1959 | Hayden |

(Continued)

FOREIGN PATENT DOCUMENTS

| CA | 2431350 A1 | 12/2004 |
| DE | 9411444 U1 | 9/1994 |

(Continued)

OTHER PUBLICATIONS

Manual for Wire Ropes as Per Indian Standard Specifications. Standard [online]. Bureau of Indian Standards, Mar. 17, 2008 [retrieved on Jan. 16, 2019]. Retrieved from the Internet: <URL: https://bis.gov.in/gazwsx/cmd/MANUAL%20FOR%20WIRE%20ROPES.pdf>. (Year: 2008).*

(Continued)

*Primary Examiner* — Matthieu F Setliff
(74) *Attorney, Agent, or Firm* — Lucas & Mercanti, LLP; Klaus P. Stoffel

(57) ABSTRACT

A wire rope assembly unit including a wire rope and a device for assembling the wire rope. The device is fastened at one end of the wire rope and has a connecting element arranged at the front on the end of the wire rope. The assembly unit has a sleeve that engages around an outer surface of an end section of the wire rope. The sleeve is made of a material of lesser rigidity than strands of the wire rope and, optionally, than the connecting element. The sleeve is pressed, hammered and/or rolled onto the wire rope and, optionally, onto the connecting element to produce a form-locked connection. Outer strands of the wire rope are separated from the wire rope in a rope section, in which the wire rope is arranged inside the sleeve, and the sleeve is connected to ends of the outer strands at its one edge.

18 Claims, 1 Drawing Sheet

(a)

(b)

(52) U.S. Cl.
CPC ...... *Y10T 29/4997* (2015.01); *Y10T 29/49931* (2015.01); *Y10T 29/53987* (2015.01)

(58) Field of Classification Search
USPC .......................................................... 403/2
See application file for complete search history.

(56) References Cited

U.S. PATENT DOCUMENTS

| | | | | |
|---|---|---|---|---|
| 3,595,140 | A * | 7/1971 | Lundin | E01C 3/006 404/35 |
| 4,034,547 | A * | 7/1977 | Loos | D07B 1/0693 57/211 |
| 4,365,906 | A * | 12/1982 | King | B63H 9/10 403/157 |
| 4,887,422 | A * | 12/1989 | Klees | D07B 1/025 57/220 |
| 2012/0034025 | A1 * | 2/2012 | Wahlberg | F16G 11/025 403/278 |

FOREIGN PATENT DOCUMENTS

| | | | |
|---|---|---|---|
| DE | 19708029 C1 | 9/1998 | |
| DE | 29623655 U1 | 2/1999 | |
| DE | 20006403 U1 | 2/2001 | |
| DE | 20014484 U1 | 1/2002 | |
| DE | 20311106 U1 | 10/2003 | |
| DE | 202005003363 U1 | 5/2005 | |
| DE | 102005044228 A1 | 4/2007 | |
| DE | 202007016642 U1 | 2/2008 | |
| GB | 352745 A * | 7/1931 | ............. F16G 11/02 |
| GB | 987107 A | 3/1965 | |

OTHER PUBLICATIONS

Composite Steel Wire Ropes for Mine Hoisting Applications. Conference [online]. Hoist and Haul Conference, Sep. 7, 2005 [retrieved on Jan. 16, 2019]. Retrieved from the Internet: <URL: http://www.ropetechnology.com/bro_engl/composite_steel_wire_rope.pdf>. (Year: 2005).*

Composite Wire Rope. Datasheet [online]. atlantic-avitaillement, 2019 [retrieved on Jan. 16, 2019]. Retrieved from the Internet: <URL: https://www.atlantic-avitaillement.com/composite-wire-rope/>. (Year: 2019).*

* cited by examiner

WIRE ROPE ASSEMBLY UNIT

The present application is a 371 of International application PCT/DE2013/100427, filed Dec. 17, 2013, which claims priority of DE 10 2013 100 732.5, filed Jan. 25, 2013, the priority of these applications is hereby claimed and these applications are incorporated herein by reference.

BACKGROUND OF THE INVENTION

The invention pertains to a wire rope assembly unit comprising a wire rope and a device for assembling the wire rope, which device is attached to one end of the wire rope and comprises a connecting element, which is arranged on the end surface of one end of the wire rope. The invention also pertains to a means and to a method for producing the wire rope assembly unit.

A wire rope assembly unit of this type is known from prior use. For assembly and disassembly and in the customizing and further processing of the wire rope, a connecting element provided with an eyelet is permanently welded to the end surface of one end. Depending on the application, the wire rope can be connected to an object which is intended to cooperate with the rope, e.g., the hook of a carabineer. The problem is that, at the weld between the wire rope and the connecting element, strong forces are present when the assembly is subjected to bending; these forces can lead to breakage as a result of material fatigue in particular. There is therefore considerable danger associated with the handling of the wire rope.

SUMMARY OF THE INVENTION

The invention is based on the goal of creating a wire rope assembly unit of the type described above by means of which the wire rope can be handled more safely.

According to the invention, the goal is achieved in that the assembly device comprises a sleeve, which surrounds a lateral surface of a terminal section of the wire rope.

Because of the arrangement of the sleeve around the wire rope, a positive connection between the wire rope and the assembly device can make it possible for tensile forces as well as bending moments and torque to be transmitted. Because local mechanical load peaks are avoided, the danger of breakage is considerably reduced.

It has been found that the wire rope assembly unit can be made especially strong if the sleeve surrounds the wire rope over a length which is at least equal to the diameter of the wire rope, preferably equal to at least 1.5 times the diameter of the wire rope. It is advisable for the connecting element to be provided with a connecting means such as an eyelet, a hook, or the like, by means of which the assembly device, i.e., the wire rope, can be connected to, or assembled with, another object such as, for example, an appropriately equipped assembly rope.

In one embodiment of the invention, the sleeve also surrounds at least a certain part of the connecting element and thus forms a connection between the wire rope and the connecting element, which is preferably provided with a connecting member such as a loop, an eyelet, a hook, or the like.

In one embodiment of the invention, the sleeve is made of a material, preferably steel, which is not as strong as the wire strands of the wire rope. For the purpose of producing a permanent connection between the connecting element and the wire rope, it is advantageous for the sleeve to be attached to the wire rope preferably by pressing, hammering, and/or rolling in such a way that the sleeve is pressed into the irregular external contours of the wire rope, as a result of which a positive connection is formed. Thanks to the arrangement of the wire rope in the softer material, furthermore, the danger is considerably reduced that the mechanical loads exerted by the assembly device on the wire rope could cause damage when the assembly device is attached to the wire rope or when the wire rope assembly unit is subsequently used.

It is advisable for the wire rope, the sleeve, and the connecting element to be made of steels of different strengths.

Whereas it would be conceivable that a permanent connection between the sleeve and the connecting element could be achieved by means of welding or adhesive bonding, for example, the sleeve, in the preferred embodiment of the invention, is pressed, hammered, and/or rolled onto the connecting element to form a positive connection. This positive connection with the connecting element is advisably achieved in that the connecting element is provided with a formation, preferably with a thread, which, when the sleeve is pressed onto the connecting element, acts like a set of teeth to interlock the sleeve and the connecting element.

In an elaboration of the invention, the outer strands of the wire rope are removed from the wire rope in the section of the rope arranged inside the sleeve, so that the sleeve can be arranged directly on the inner strands of the wire rope. The sleeve preferably surrounds the inner strands over a length which is equal at least to the diameter of the part of the wire rope with the exposed inner strands, preferably equal to 1.5 times this diameter. Especially when the wall thickness of the sleeve is approximately the same as the thickness of the outer strands, it is possible to form a wire rope assembly unit with an essentially uniform outside diameter. This is advantageous especially when only a limited amount of space is available for the use of the assembly device, e.g., when the wire rope is being assembled on the block of a pulley, during which the connecting element and the sleeve are pulled through the block.

The sleeve is advisably pressed onto the inner strands of the wire rope and forms a positive connection between the sleeve and the wire rope.

In an especially preferred embodiment of the invention, the sleeve, which is preferably made out of a weldable steel, is connected at one edge to the ends of the outer strands, preferably welded to them, so that forces can be transmitted from the sleeve directly to the outer strands.

Both the connection of the wire rope to the assembly device by pressing, hammering, or rolling and the connection of the wire rope to the assembly device by connecting the edge of the sleeve to the ends of the outer strands are each independently adapted to the transmission of the tensile forces, bending moments, and torques occurring during the use of the wire rope assembly unit, so that either type of connection can be provided by itself to form the wire rope assembly unit. It is obvious, however, that an especially strong wire rope assembly unit can be obtained by forming the connection both by pressing, hammering, or rolling and by connecting the edge of the sleeve to the ends of the outer strands.

In the following, the invention is explained in greater detail on the basis of an exemplary embodiment and the attached drawings, which illustrate this exemplary embodiment:

DETAILED DESCRIPTION OF THE INVENTION

Figure 1:
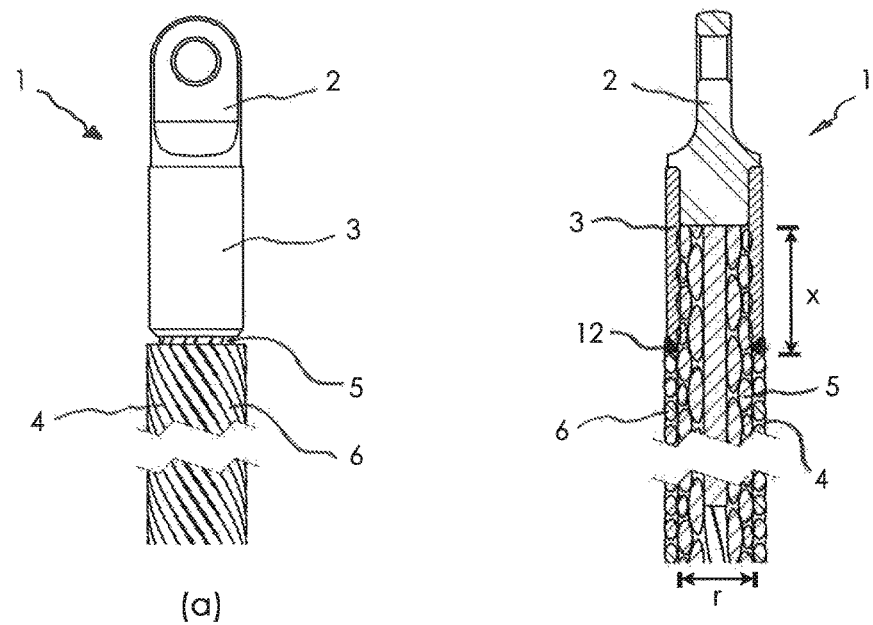
FIG. 1 shows a side view and a cross section of the wire rope assembly unit according to the invention.

FIG. 1 shows a wire rope assembly unit according to the invention comprising a wire rope 4 and an assembly device 1, which comprises a connecting element 2 and a sleeve 3.

Figure 2:
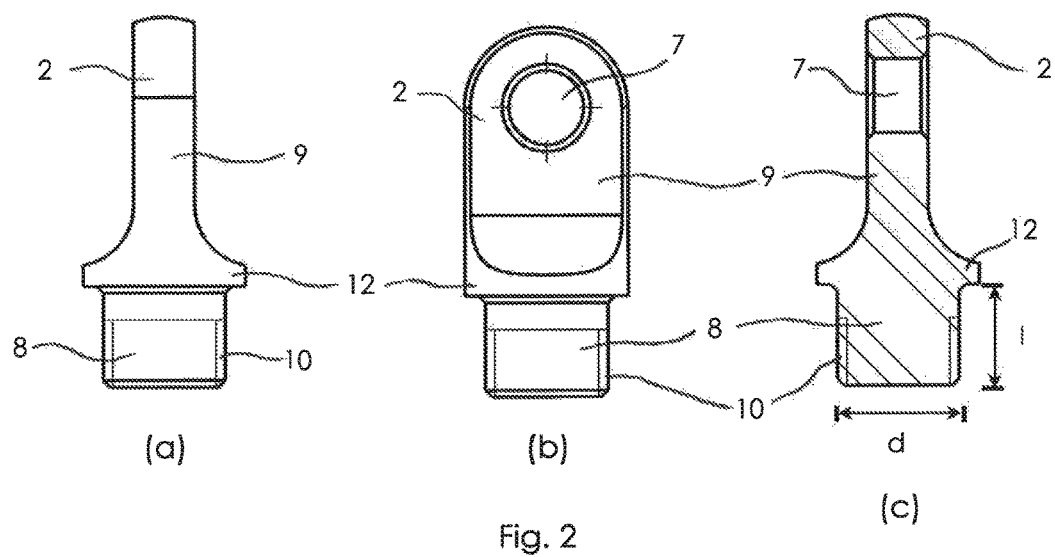
FIG. 2 shows various views of a means for producing the wire rope assembly unit according to the invention.
Figure 3:
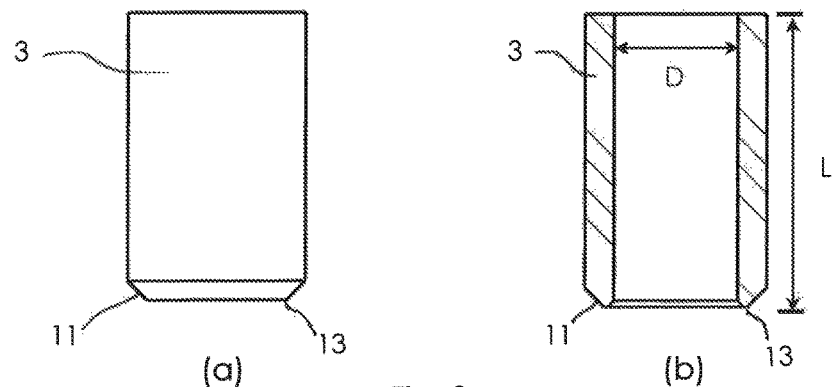
FIG. 3 shows various views of another means for producing the wire rope assembly unit according to the invention.

The connecting element 2 shown in greater detail in FIG. 2 comprises a cylindrical section 8 of length 1, the diameter d of which is approximately the same as the diameter r of the part of the wire rope 4 formed by the inner strands 5; the lateral surface of this cylindrical section is provided with a thread 10. Between the cylindrical section 8 and a connecting member 9, which is provided with an opening 7 to accept a carabineer or the like, the connecting element 2 comprises a collar 12, which has a diameter somewhat larger than that of the cylindrical section 8.

The sleeve 3, which has a length L, is provided with an inside diameter D, which is slightly larger than that of the cylindrical section 8, so that it can be pushed onto the section 8 with a small amount of play. At its edge 13, the sleeve 3 is provided externally with a bevel 11.

As can be seen especially clearly in the cross-sectional diagram of FIG. 1b, the outer strands 6 of the wire rope 4 have been removed from the wire rope 4 in a terminal section of the wire rope 4, i.e., the section of the wire rope 4 which is arranged in the sleeve 3, so that the wire rope 4 is seated only by its inner strands 5 in the sleeve 3.

To produce the wire rope assembly unit shown in FIG. 1, first the outer strands 6 are cut off at one end of the wire rope 4 over a length of x=L−1. Then the sleeve 3 is pushed onto the inner strands 5 of the wire rope 4 until its edge 13, on which the bevel 11 is provided, comes to rest against the ends of the outer strands 6. Then the connecting element 2 is pushed into the sleeve 3, so that its cylindrical section 8 is seated on the ends of the inner strands 5 and the bottom surface of its collar 12 rests on the other edge of the sleeve 3.

Then the sleeve 3 is pressed onto the connecting member 2 and onto the inner strands 5 of the wire rope 4 by a pressing tool, wherein the inside surface of the sleeve 3 at the level of the cylindrical section 8 is pressed into the thread 10, which acts as set of interlocking teeth, and at the level of the inner strands 5 is pressed into the outer contours of the inner strands 5 to form a positive connection.

To produce an additional connection between the sleeve 3 and the outer strands 6, the outer strands 6 can also be welded to the edge of the sleeve 3 at which the bevel 11 is provided. FIG. 1b shows such a weld 12.

The invention claimed is:

1. A wire rope assembly unit, comprising:
    a metal wire rope;
    a device for assembling the metal wire rope, the device is attached to one end of the metal wire rope and comprises a connecting element that is arranged on an end surface of one end of the metal wire rope; and
    a sleeve that surrounds a lateral surface of a terminal section of the metal wire rope, wherein outer metal strands of the metal wire rope are completely removed from the metal wire rope in the terminal section of the metal wire rope that is arranged inside the sleeve so that the sleeve is exclusively over inner strands of the metal wire rope.

2. The wire rope assembly unit according to claim 1, wherein the sleeve surrounds at least a part of the connecting element.

3. The wire rope assembly unit according to claim 1, wherein the sleeve is made of a material that is not as strong as strands of the metal wire rope.

4. The wire rope assembly unit according to claim 3, wherein the sleeve material is not as strong as the connecting element.

5. The wire rope assembly unit according to claim 1, wherein the sleeve is attached to the metal wire rope to form a positive connection.

6. The wire rope assembly unit according to claim 5, wherein the sleeve is pressed, hammered, and/or rolled onto the metal wire rope.

7. The wire rope assembly unit according to claim 6, wherein the sleeve is pressed, hammered, and/or rolled onto inner strands of the metal wire rope in the terminal section of the rope.

8. The wire rope assembly unit according to claim 5, wherein the sleeve is attached to the connecting element to form a positive connection.

9. The wire rope assembly unit according to claim 8, wherein the connecting element has a formation that, when the sleeve is pressed onto the connecting element, acts as a set of teeth to interlock the sleeve and the connecting element.

10. The wire rope assembly unit according to claim 9, wherein the formation is a thread.

11. The wire rope assembly unit according to claim 1, wherein the sleeve has one edge connected to ends of the outer strands.

12. The wire rope assembly unit according to claim 11, wherein the one edge of the sleeve is welded to the ends of the outer strands.

13. A method for producing a wire rope assembly unit consisting of a wire rope and a device for assembling the wire rope according to claim 1, the method comprising the steps of: attaching the assembly device to one end of the wire rope by arranging a connecting element of the assembly device on an end surface of one end of the wire rope; and attaching a sleeve of the assembly device to the wire rope so that the sleeve surrounds a lateral surface of a terminal section of the wire rope.

14. The method according to claim 13, wherein the sleeve is attached to the wire rope to form a positive connection.

15. The method according to claim 14, wherein the sleeve is pressed, hammered, and/or rolled onto the wire rope.

16. The method according to claim 14, wherein the sleeve is positively connected to the connecting element.

17. The method according to claim 13, including removing outer strands of the wire rope from the wire rope in the terminal section of the wire rope before the sleeve is arranged on the wire rope.

18. The method according to claim 17, including welding the sleeve is connected to ends of the outer strands.

* * * * *